(12) United States Patent
Hogue

(10) Patent No.: US 6,347,415 B1
(45) Date of Patent: Feb. 19, 2002

(54) TOILET SEAT AND LID ASSEMBLY

(76) Inventor: Aaron G. Hogue, 4480 Linne Rd., Paso Robles, CA (US) 93446

( * ) Notice: Subject to any disclaimer, the term of this patent is extended or adjusted under 35 U.S.C. 154(b) by 0 days.

(21) Appl. No.: 09/705,608

(22) Filed: Nov. 3, 2000

Related U.S. Application Data

(63) Continuation-in-part of application No. 09/089,469, filed on Jun. 2, 1998, now Pat. No. 6,154,892.

(51) Int. Cl.$^7$ .................................................. A47K 13/00
(52) U.S. Cl. ...................... 4/234; 4/240; 4/237; 4/242.1
(58) Field of Search ............................ 4/234, 237, 240, 4/292.1, 236, DIG. 6

(56) References Cited

U.S. PATENT DOCUMENTS

| | | | | |
|---|---|---|---|---|
| 3,073,937 A | * | 1/1963 | Easley | 4/237 |
| 3,854,150 A | * | 12/1974 | Samuels et al. | 4/237 |
| 3,863,277 A | * | 2/1975 | Herrison | 4/234 |
| 3,988,789 A | * | 11/1976 | Blount | |
| 4,085,496 A | * | 4/1978 | Seiderman | 4/237 |
| 4,244,764 A | * | 1/1981 | Ginsburg | 4/234 |
| 4,318,213 A | * | 3/1982 | Blount | |
| 4,983,647 A | * | 1/1991 | Ueno et al. | |
| 5,426,793 A | * | 6/1995 | Mac | 4/234 |

FOREIGN PATENT DOCUMENTS

| | | | |
|---|---|---|---|
| JP | 0679359 A | * | 11/1995 |
| WO | WO9629361 A | * | 9/1996 |

* cited by examiner

Primary Examiner—David J. Walczak
(74) Attorney, Agent, or Firm—Charles C. Logan II

(57) ABSTRACT

A toilet seat and lid, each comprising a rigid insert injection molded of thermoplastic material. Each insert is then over-molded by injection molding with a thermoplastic elastomeric material which provides the outer surface of the seat and lid. The inserts are dimensioned with respect to their over-molded surfaces to be smaller than the finished seat and lid and are designed to give maximum strength to the seat and lid. Each insert is shaped to promote the flow of the over-mold material and to minimize shrinking, swelling or distortion of the insert. The elastomeric material is preferably chemically compatible with the inserts to allow a chemical as well as a mechanical bond to take place. The over-molded material provides the desired soft, non-slip, warm to the touch outer characteristics of the seat and lid.

22 Claims, 15 Drawing Sheets

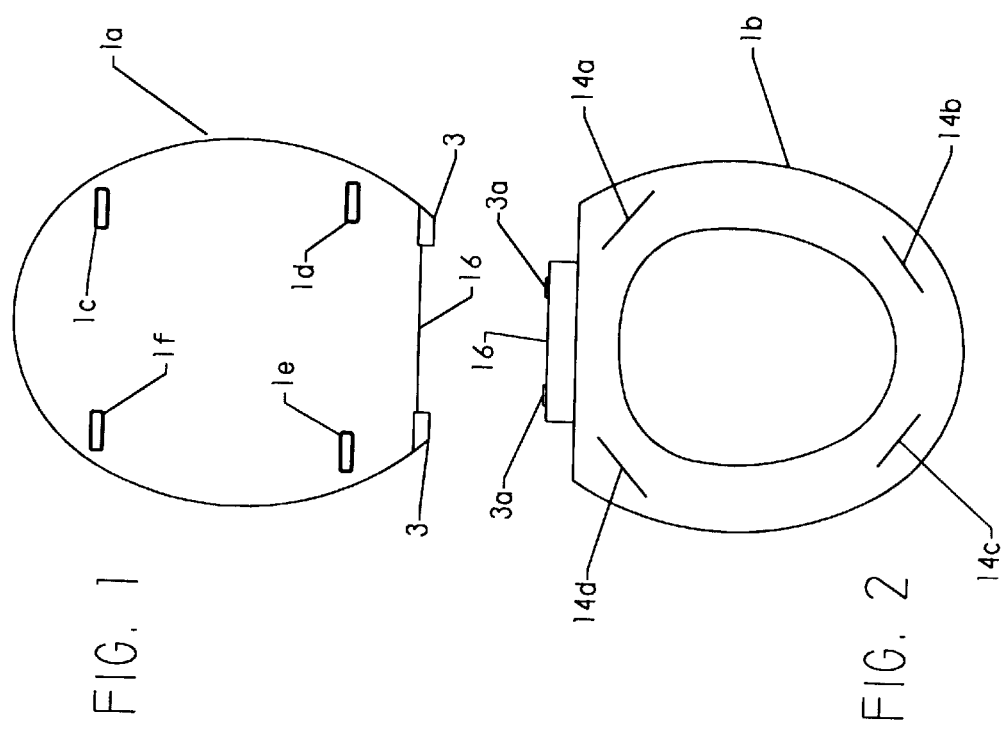

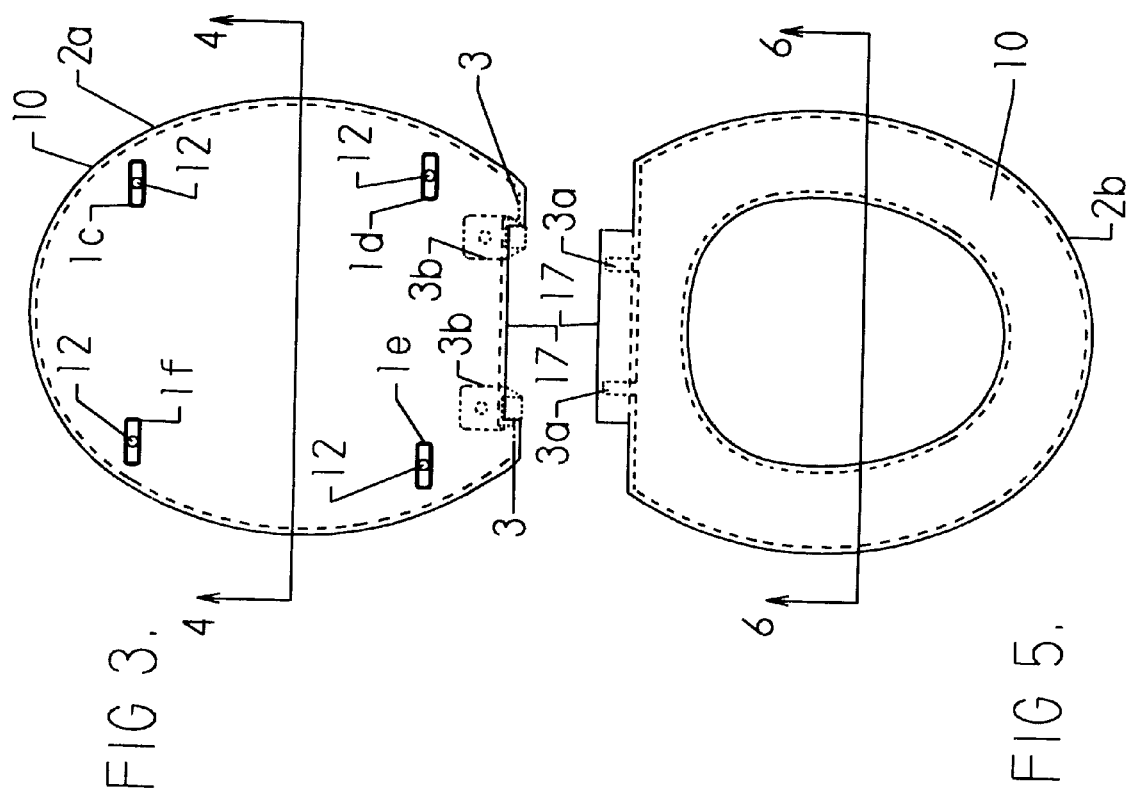

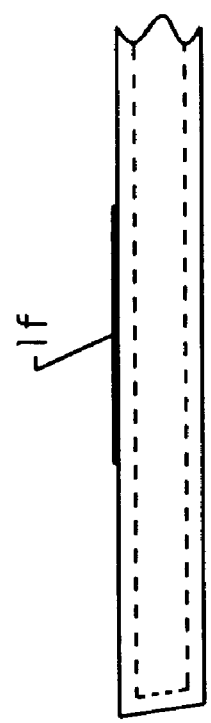
FIG. 4
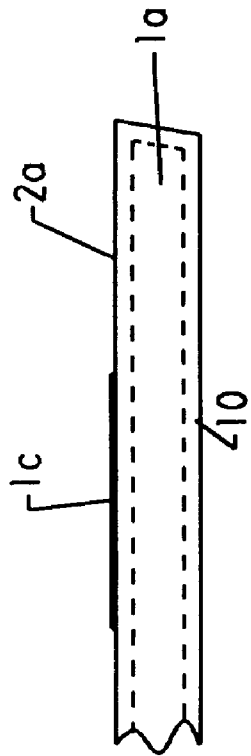
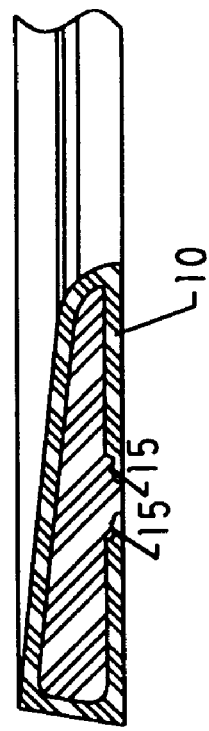
FIG. 6
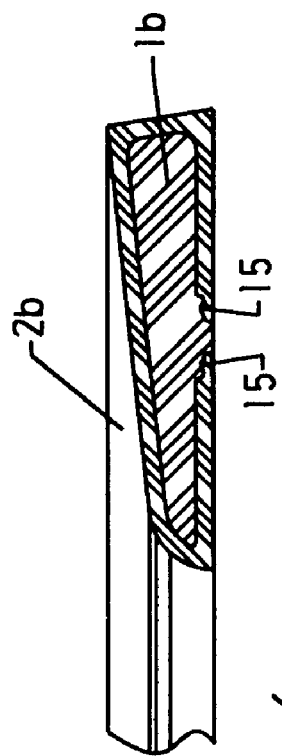

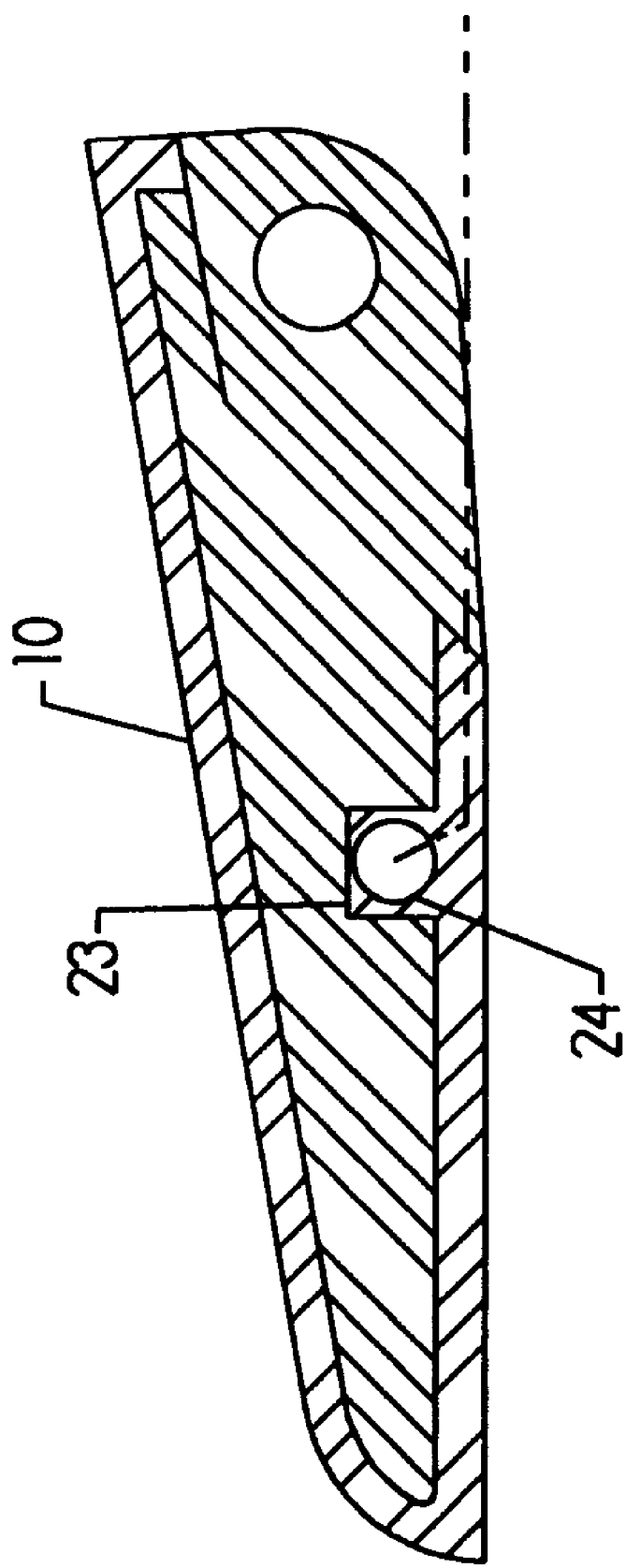

TOILET SEAT AND LID ASSEMBLY

This application is a continuation-in-part Of U.S. patent application Ser. No. 09/089,469 filed on Jun. 2, 1998 that issued as U.S. Pat. No. 6,154,892 on Dec. 5, 2000.

TECHNICAL FIELD

The invention relates to a seat and lid assembly for a toilet, and more particularly to such a seat and lid compromising injection molded, reinforced plastic inserts injection over-molded with a chemically compatible material which provides the desired outer surface characteristics of the seat and lid.

BACKGROUND ART

The invention is directed to the improvement of the feel and comfort of a toilet seat and lid, and to the provision of a comfortable, warm, non-slip seating surface. This is accomplished by utilizing modern thermoplastic material and high-pressure injection molding techniques. While not intending to be so limited, the invention will be described in its application to a toilet seat and lid. It will be understood that the basic teachings of the present invention can be applied to toilet seats without lids and other types of seats.

Prior art workers have devised many types of toilet seats and lids to improve the comfort, look and convenience thereof Heretofore toilet seats and lids have been constructed from rigid materials such as wood or plastic, or made from a solid core upholstered in foam padding and/or a vinyl covering. Typical rigid plastic or wood seats are relatively cold to the touch and slippery. Upholstered seats and lids, with or without padding, are not particularly durable and are susceptible to cuts and tears. Additionally some people find the feel of padded vinyl seats and lids to be undesirable. Prior art workers have molded a material over another material in an attempt to hide imperfections in a thick part but still produce a hard rigid seat that does not address the issues of comfort and non slip characteristics. Prior art workers have also attempted to produce a padded, resilient-type seat using complicated and costly molding methods employing catalyzed materials such as urethane. Molding a seat by using catalyzed low pressure materials requires time-consuming mixing and pouring, resulting in less than satisfactory results and a costly product.

The present invention is based upon the discovery that a seat and lid assembly comprising inserts of reinforced thermoplastic material, with over-molded thermoplastic material which determines the characteristics of the outer surface of the seat and lid, can overcome the above noted problems. There are six Shore scales that are used to measure the hardness of synthetic materials. They are as follows: Shore A, Shore B, Shore C, Shore D, Shore DO and Shore OO. All of the scales range from 0–100. The most commonly used scales are Shore A and Shore D. There is no direct conversion between the different scales. An example of an approximate comparison would be (Shore A 50=Shore B 30–35=Shore C 20=Shore D 10–15). Another example of approximate comparison would be (Shore A 100=Shore B 85=Shore C 65=Shore D 45). The preferred polypropylene material used for the insert has a hardness of approximately Shore D 70. When a thermoplastic elastomeric material with a Shore A durometer of 90 or below is used as the over-mold material, the seat and lid are provided with a soft, comfortable, durable surface which will not tear and which have non-slip characteristics, which, nevertheless, allows reasonable mobility while using the seat. The thermoplastic elastomeric material should not have a durometer hardness greater than Shore D50. Some synthetic materials have a durometer hardness that would be measured on the Shore A scale. Harder synthetic materials would be measured on the Shore D scale. The elastomer provides a completely different and arguably superior feel as compared to conventional seats and padded seats. The seat of the present invention is not padded and does not deform when sat upon. The surface also provides an aesthetically pleasing finish which is easily cleaned and is available in many colors.

It is an object of the present invention to provide an injection molded toilet seat and lid which are soft to the touch and relatively warm and non-slip as compared to a conventional hard seat and lid.

It is an object of the present invention to provide a toilet seat and lid with the above features which are both strong and durable.

It is an object of the present invention to provide a toilet seat and lid with the above features which are easy to clean.

It is an object of the present invention to provide a more comfortable and non-slip toilet seat and lid assembly, than is achievable with existing designs and conventional construction techniques.

It is an object of the present invention to provide a seat and lid with antimicrobial qualities.

Finally, it is an object of the invention to provide a soft feeling injection molded toilet seat shaped to fit the user comfortably.

DISCLOSURE OF THE INVENTION

According to the invention there is provided a strong, durable, comfortable toilet seat and lid assembly which is non-slip and easy to clean. The assembly comprises rigid inserts molded of a reinforced thermoplastic material. The inserts are over-molded with a thermoplastic material which provides them with the desired surface characteristics.

The inserts are precisely dimensioned so that their areas to be over-molded are smaller than the finished seat. The inserts are designed to give maximum strength to the seat and lid and are shaped to promote the flow of the over-mold material to minimize flowjoint or flow weld problems, to be described hereinafter. Each insert is designed to minimize shrinking, swelling or distortion thereof and, to this end, can be provided with strategically located ribs and appropriate cored areas.

When the thermoplastic material of the inserts and the over-mold material elastomer are both of the same chemical base, the over-mold will bond both mechanically and chemically with the inserts and will provide the seat and lid with a soft, comfortable, non-slip surface. The surface may be smooth or textured to enhance the feel and appearance of the seat.

BRIEF DESCRIPTION OF THE DRAWINGS

FIG. 1 is an inside elevational view of the lid insert of the present invention.

FIG. 2 is a top plan view of a seat insert of the present invention.

FIG. 3 is an inside elevational view of an over-molded lid of the present invention.

FIG. 4 is a fragmentary cross-sectional view taken along section line 4—4 of FIG. 3.

FIG. 5 is a top plan view of an over-molded seat of the present invention.

FIG. 6 is a fragmentary cross-sectional view taken along section line 6—6 of FIG. 5.

FIG. 18 is a cross-sectional view of a seat of the present invention provided with a groove and heating element therein covered by the over-mold material.

FIG. 18 is a cross-sectional view of a seat of the present invention provided with a groove and heating element therein covered by the over-mold material.

DETAILED DESCRIPTION OF THE INVENTION

It will be understood by one skilled in the art that, for each type or model of seat and lid to which the present invention is to applied, the finished seat and lid, inserts and the molds must be appropriately designed in accordance with the teaching of the present invention.

Figure 16:
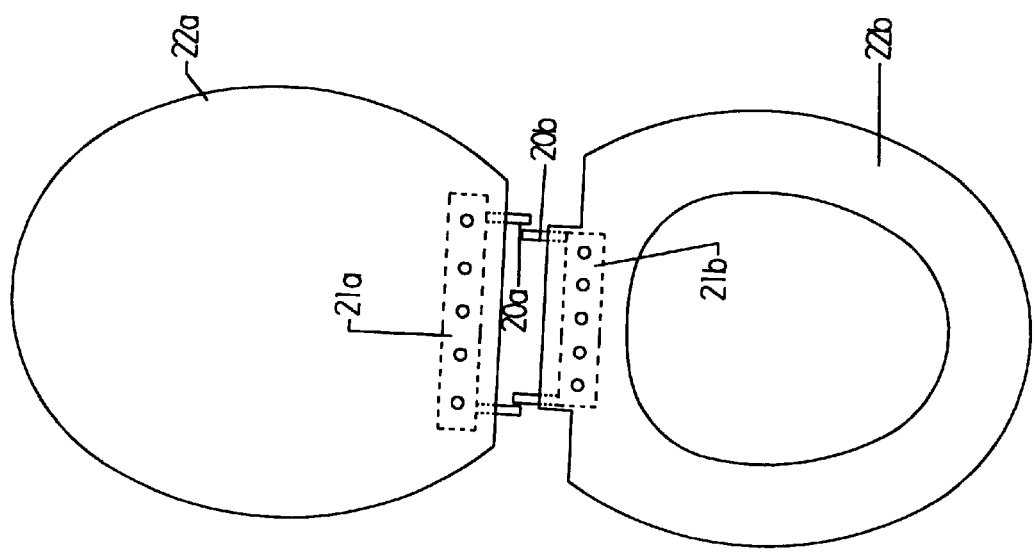
FIG. 16 is an exploded view of a lid and seat of the present invention provided with hinge elements which are embedded in the inserts thereof.

The exemplary seat and lid are each made of two major parts, (an insert and an over-mold), in two steps. In some embodiments additional parts may be used such as hinges imbedded on or molded as part of the inserts, as will be described hereinafter. In the exemplary embodiment, the first step is the injection molding of the strong substantially rigid, lightweight seat inserts. The inserts are best shown in FIGS. 1 and 2, and are generally indicated at 1a and 1b. The inserts 1a and 1b constitute substantially the bulk of the finished seat and lid and serve as the skeleton of the over-molded seat 2b and 2a of FIGS. 3 and 5. The seat portion insert 1b of FIG. 2 comprises a generally oval structure forming the shape of the seat, and is dimensioned to fit the particular toilet for which it is designed. The seat may have any appropriate shape including the well-known "C" shape, open-front configuration. The lid insert 1a is generally shaped in an oval to approximate the shape of the finished lid 2a. The rearward portions of the lid insert 1a and the seat insert 1b have either hinges 3 and 3a molded as part of the inserts as shown in FIGS. 1 and 2, or hinges imbedded or otherwise appropriately attached to the inserts as shown in FIG. 16.

The inside surface of the lid insert 1a is provided with four integral stand-offs constituting a one-piece part of insert 1a and indicated at 1c, 1d, 1e, and 1f. In a similar fashion, the bottom surface of the seat insert 1b is provided with four integral stand-offs constituting a one-piece part of insert 1b and indicated at 1g, 1h, 1i and 1j.

Inserts 1a and 1b are preferably molded of a strong, reinforced, synthetic material. Any appropriate synthetic material can be used as long as it is chemically compatible with the over-molded material. The synthetic material of the inserts may include a reinforcing filler material. Some examples of a reinforcing filler material are: 1) a fiberglass reinforced, olefin base, thermoplastic material, 2) a fiberglass reinforced polypropylene, 3) a fiberglass reinforced polypropylene containing from about 1% to about 2% of a foaming agent. When the preferred thermoplastic elastomer TPE) over-mold is used as is described hereinafter, an olefin base thermoplastic material is necessary for the insert because, under these circumstances, the over-mold material will chemically bond with the insert material. When the injection molded seat insert comprises an olefin thermoplastic, the over-mold layer may comprise an olefin base thermoplastic elastomer chemically bonded to the injection molded seat insert. When the injection molded seat insert comprises a fiberglass reinforced polypropylene, the over-mold layer may comprise an olefin base thermoplastic elastomer chemically bonded to the injection molded seat insert. Excellent results have been achieved, for example, when specific formulations of polypropylene are used as the base reinforcing insert. The preferred high Crystalline, Homo-polymer polypropylene provides excellent adhesion to compatible olefin elastomers as well as a high resistance to abnormal sinks and flow lines. This material, once cured, has a great scratch resistance and a higher flexural modulus than co-polymer polypropylene. An example of such material is manufactured by Huntsman Corp of Salt Lake City, Utah and is identified as product #HOMPP-P4C6Z052.

The reinforced synthetic material can also be combined with an endothermic foaming agent. The foaming agent enables the molding of thick, lightweight portions of the insert without visible "sink" areas, gross warping, or the like. In addition, the foaming agent helps minimize or eliminate "joint" and "weld" problems. Welds, for example, are created when portions of molten plastic, traveling in different directions, meet in the mold and solidify. The insert mold must be designed in such a way to overcome this problem so that the weight of a person sitting or standing on the seat will not cause a failure. A preferred way to overcome or minimize flow joints or flow welds is to introduce the material into the mold from one source through a single gate, when possible. On the other hand, in accordance with conventional molding techniques, the sheer size of the seat would dictate the provision of multiple sources of mold material and multiple gates to guarantee complete fill. Multiple sources and gates, however, potentially cause welds and joints. In the insert embodiments illustrated in FIGS. 1 and 2, the joint and weld problems were overcome by using the above noted endothermic foaming agent which, when activated, becomes solvent-like, thereby lowering the polymer viscosity during the injection molding process for the inserts 1 and 1a. Because of the reduced melt viscosity, molds can be made for the lid and seat inserts, each having a single gate resulting in the production of lid and seat inserts free of numerous polymer welds. With other seat designs and configurations multiple gates may be desired or required.

The foaming agent also enhances the inserts by creating essentially a structural "honeycomb" within the inserts themselves. Excellent results have been achieved with a foaming agent sold by Reedy International of Keyport, N.J., under the trademark SAFOAM and the designation PE-50. The foaming agent constitutes from 1% to 2% of the synthetic material-foaming agent combination.

The inserts are designed to give maximum strength to the finished seat and lid assembly. In addition, the inserts may be cored out in critical thick areas to reduce warping, excessive swelling or other deformation of the insert.

As indicated above, each overall insert is precisely dimensioned so that its areas to be over-molded are smaller than the finished seat. The dimensions are chosen to minimize warpage of the insert and to allow for proper over-molding material flow and bonding.

Once inserts 1a and 1b are molded, the next step is to mount the inserts in final molds and injection mold (over-mold under heat and pressure) thereon the thermoplastic elastomer. As indicated above, the thermoplastic elastomeric material preferably should be chemically compatible with the material from which the inserts are molded so that a chemical bond occurs between the synthetic material of the insert and the thermoplastic elastomer of the over-mold. Excellent results have been provided, for example with a thermoplastic elastomer provided by Advanced Elastomer Systems of St. Louis, Mo., under the trademark SANTO-PRENE.

An antimicrobial additive can be blended with the Santoprene to give the seat surface built-in antimicrobial characteristics. Excellent results have been achieved with an antibacterial additive provided by Morton International of Boston, Mass. under the designation Vinyzene.

Figure 7:
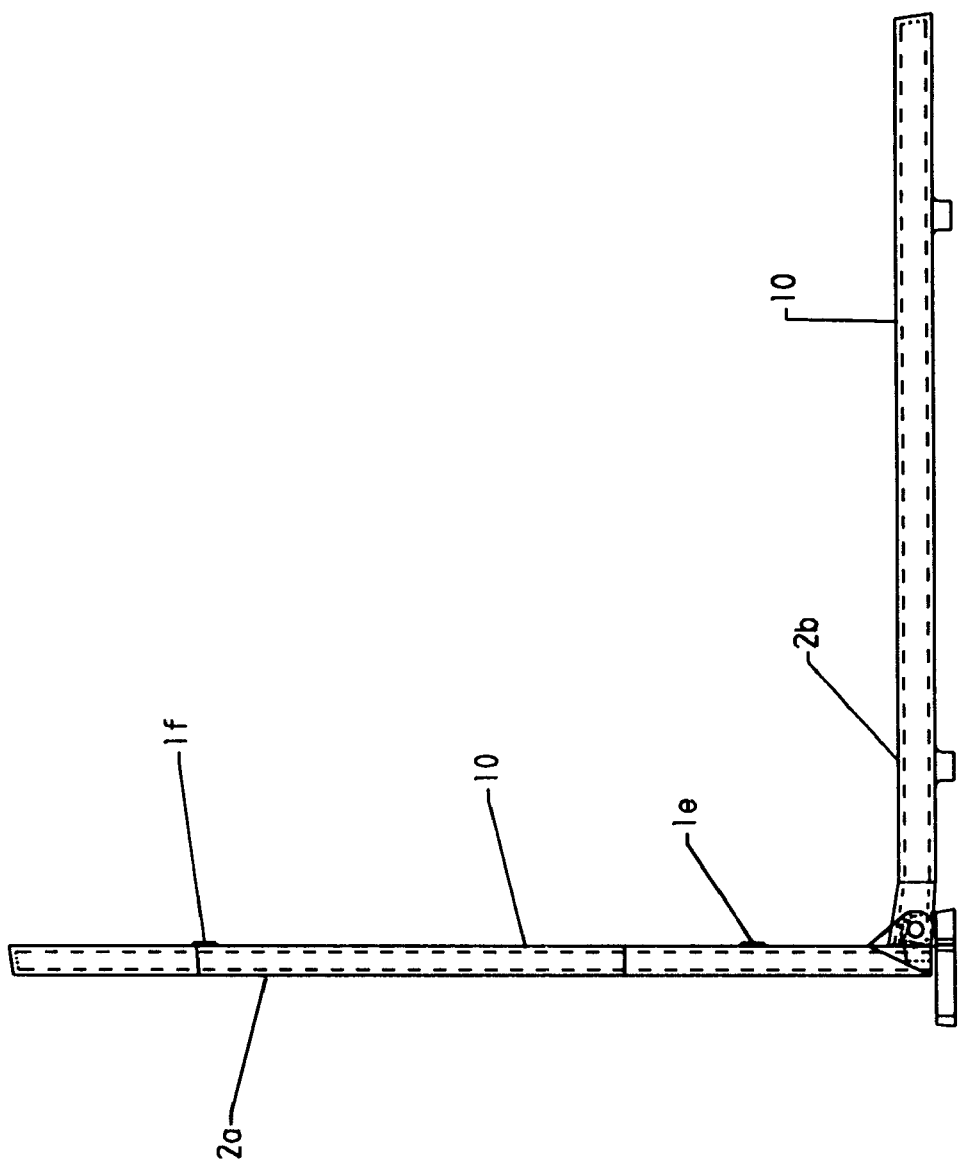
FIG. 7 is a side elevational view of the lid and seat of FIGS. 3 and 5.
Figure 8:
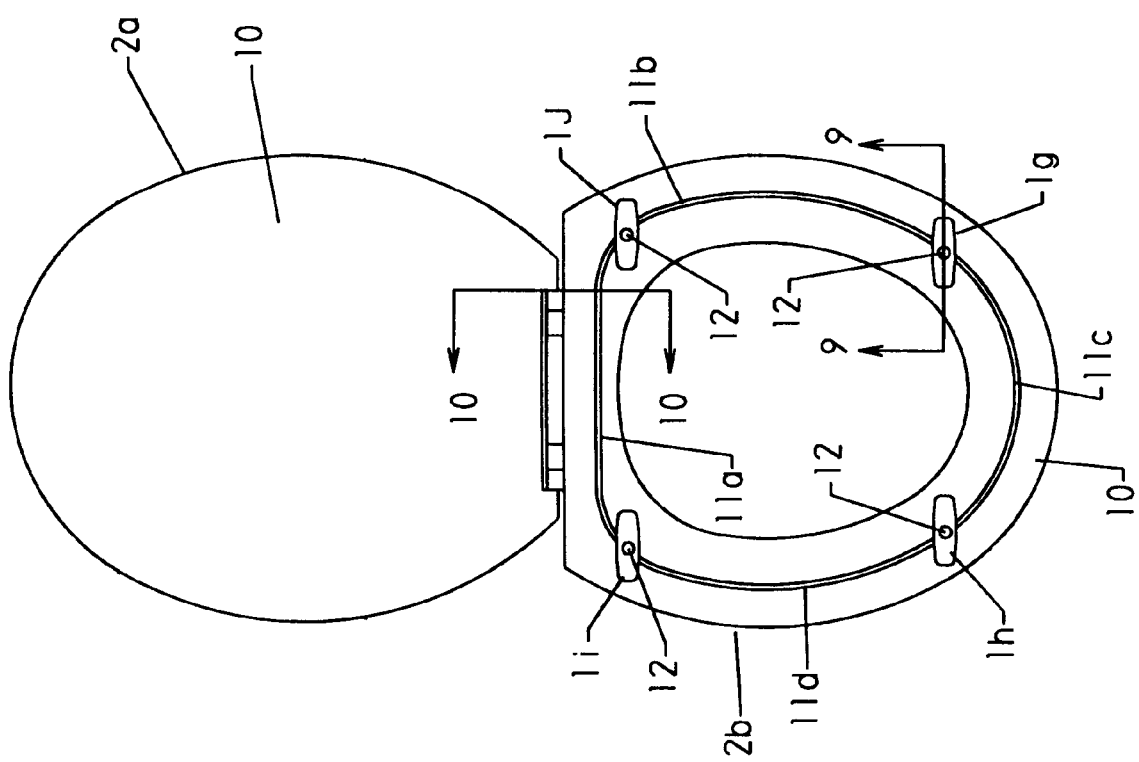
FIG. 8 is an elevational view of the upper surface of the lid of FIG. 7 and the bottom surface of the seat of FIG. 7.

The inside elevation view of FIG. 3 illustrates the over-molded lid insert, generally indicated at 2a. FIG. 5 is a top view of the over-molded seat insert, generally indicated at 2b. FIG. 4 is a fragmentary transverse cross-sectional view of the over-molded lid 2a taken along section line 4—4 of FIG. 3. FIG. 6 is a fragmentary cross-sectional view taken along section line 6—6 of FIG. 5. FIG. 7 is a side elevational view and FIG. 8 is a view of the assembled over-molded lid 2a and over-molded seat 2b illustrating the top surface of the over-molded lid 2a.

Figure 9:
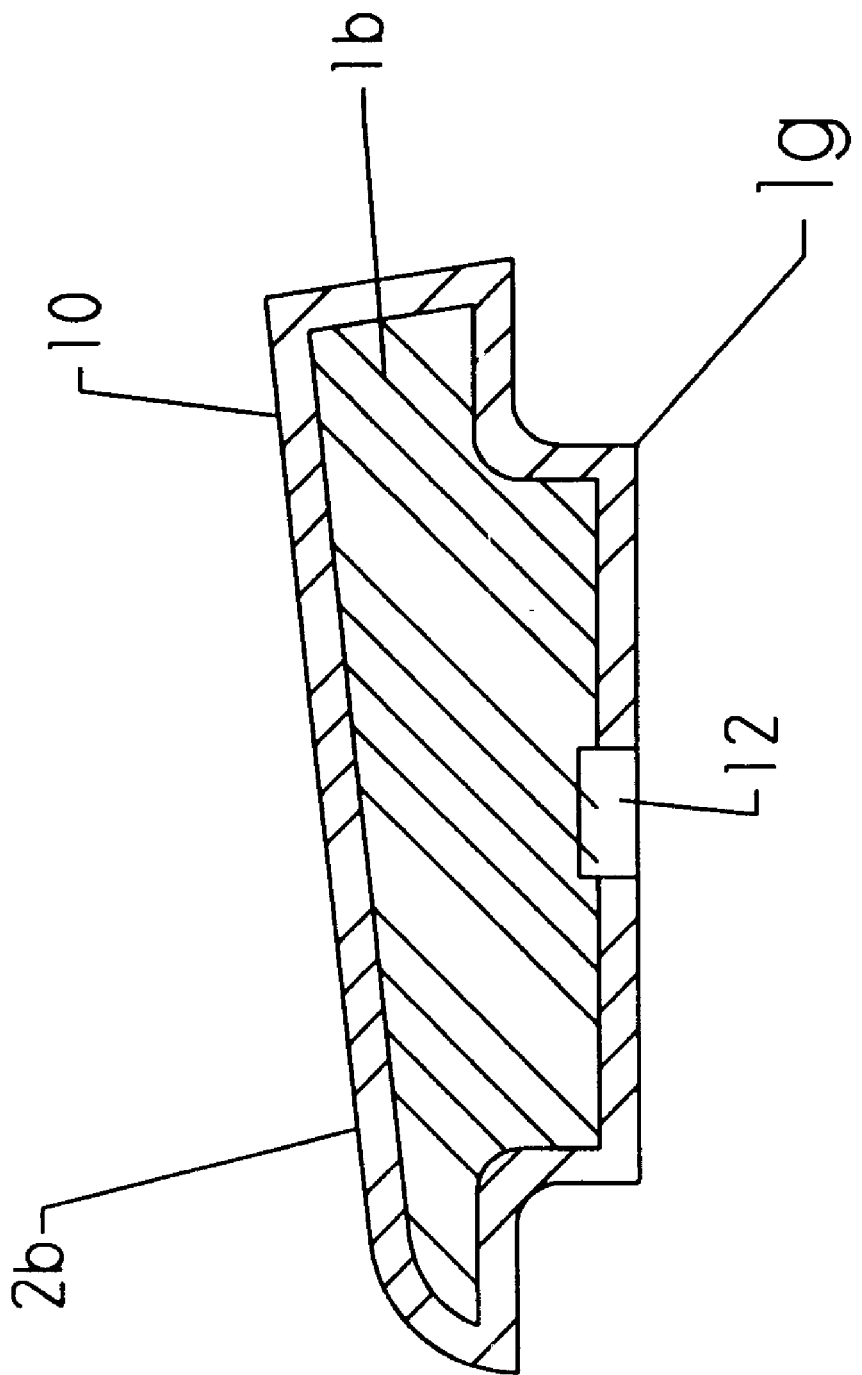
FIG. 9 is a cross-sectional view taken along section line 9—9 of FIG. 8.
Figure 10:
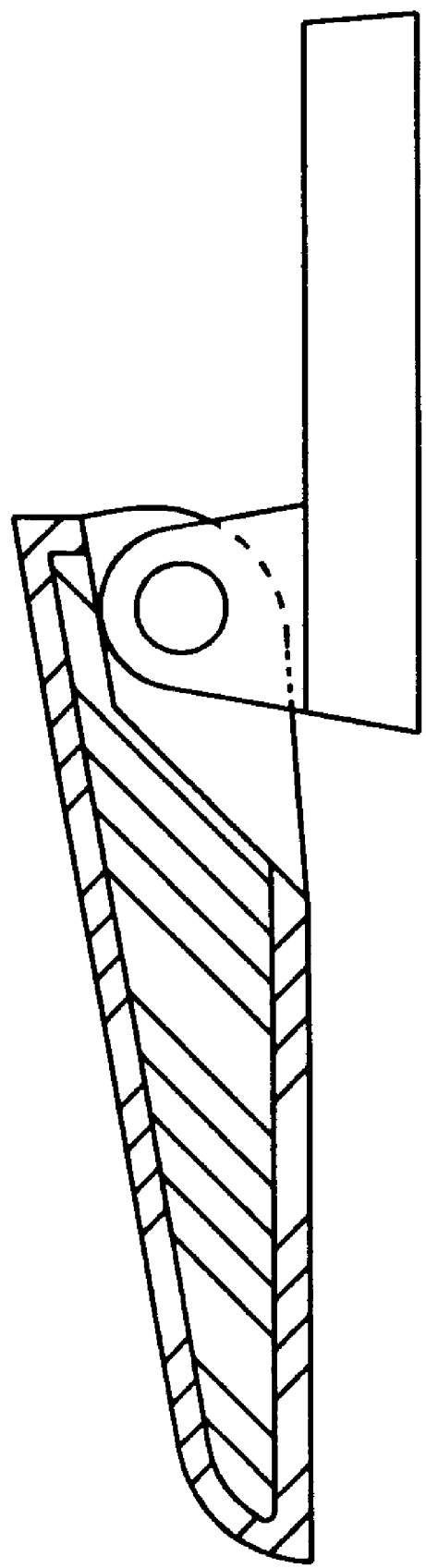
FIG. 10 is a cross-sectional view taken along section line 10—10 of FIG. 8.

In these figures, the thermoplastic rubber over-mold is generally indicated at 10. The rearward most end of the lid and seat inserts are over-molded, with the exception of the hinge contact points as is clearly shown in FIGS. 3, 5 and 10. Generally, the entire exterior surfaces of inserts 1a and 1b are over-molded although on some designs some insert surfaces will be exposed. For example, in the preferred embodiment, ribs 11a and 11b, 11c and 11d are not over-molded (see FIG. 8). In addition, each of the lid stand-offs 1c, 1d, 1e and 1f and each of the seat stand-offs 1g, 1h, 1i and 1j has a hole 12 formed in the over-molding material thereon. These are clearly shown in FIGS. 3 and 8. The holes are formed by the molds for the over-molding process which uses the stand-offs of the lid 2a and 2b as contact points for the mold elements which support the inserts 1a and 1b in the over-mold molds. FIG. 9 is a cross-sectional view taken along section 9—9 of FIG. 8. The section line passes through stand-off 1g and clearly shows the hole 12. FIG. 10 clearly shows that the hinge contact points are not over-molded.

Figure 11:
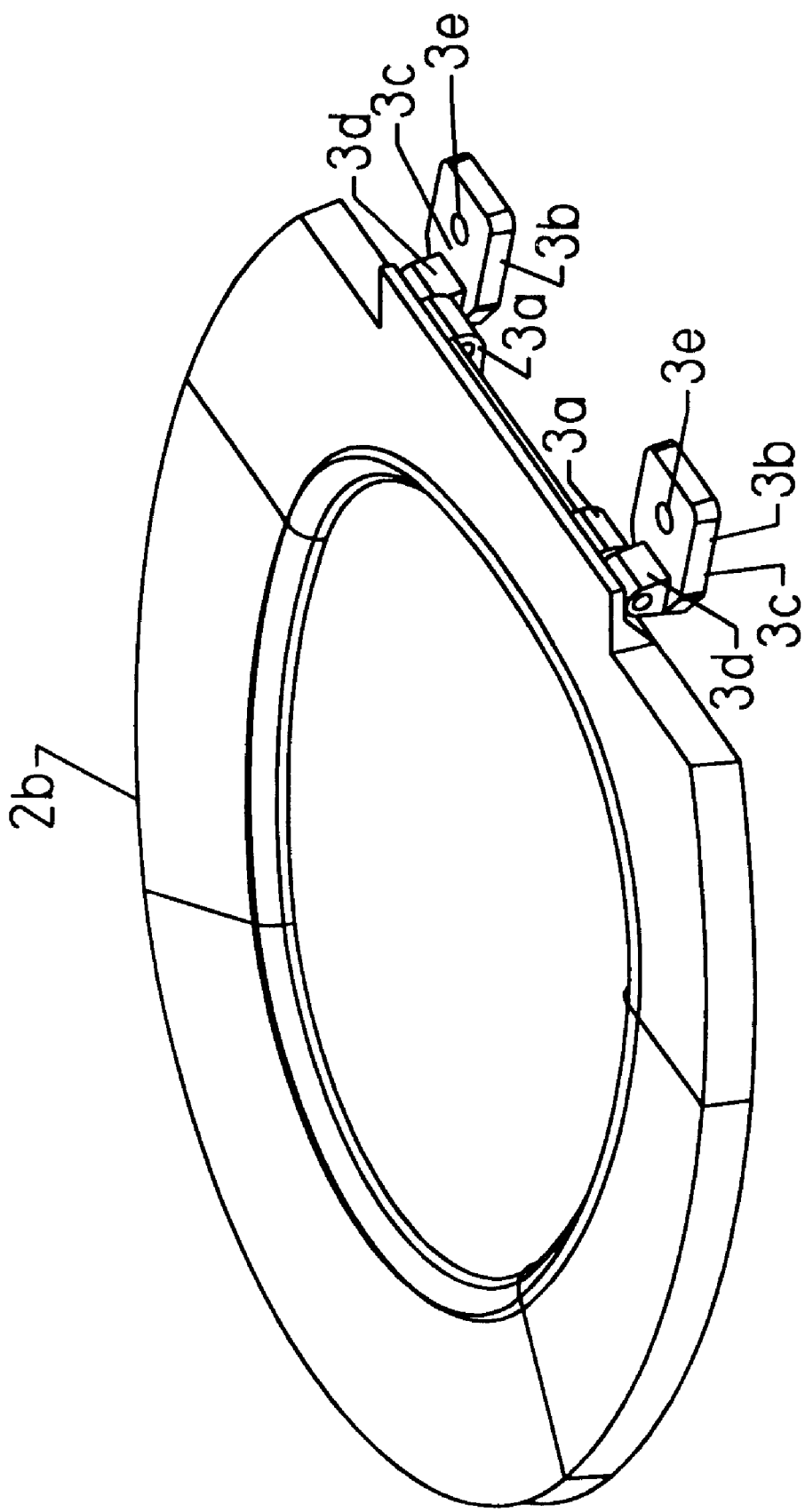
FIG. 11 is a perspective view of the over-molded seat of the present invention together with the hinge elements by which it is hingedly attached to the toilet bowl.

Reference is made to FIGS. 10 and 11. These figures show the hinge elements 3a of seat 2b. The figures also illustrate an additional hinge element 3b for each hinge element 3a by which the seat and lid are affixed to the toilet bowl. Each of the two hinge elements 3b have a base portion 3c and an upstanding hinge member 3d. Each base portion 3c has a perforation 3e formed therein enabling it to be bolted to the toilet bowl. The hinge elements 3b could comprise over-molded elements except for the hinge contact faces. They could also simply comprise metallic or plastic molded members. In FIG. 11 it is clear that the hinge element 3a of seat 2b lie just inside hinge elements 3d. While the lid 2a and its hinge elements 3 are not shown in FIG. 11, it is evident from FIG. 5 that the lid hinge elements 3 will lie just outside hinge elements 3d. The hinge elements of each group of three 3, 3d, and 3a have coaxial perforations for the receipt of a hinge pin.

It will be understood that distortion considerations due to shrinkage, warpage, outside forces and the like are unique with respect to each over-molded seat. The inserts 1a and 1b are first molded at which point minimal shrinkage or warpage may occur and thereafter the insert components become stabilized.

Next, the over-molding places a new thermoplastic material over the already stabilized inserts creating stresses not found in single stage molded parts, When the over-mold material is applied to the inserts with the appropriate heat and pressure, and then allowed to cool and stabilize, shrinkage of the thermoplastic rubber will tend to warp certain areas of the lid and seat.

Figure 12:
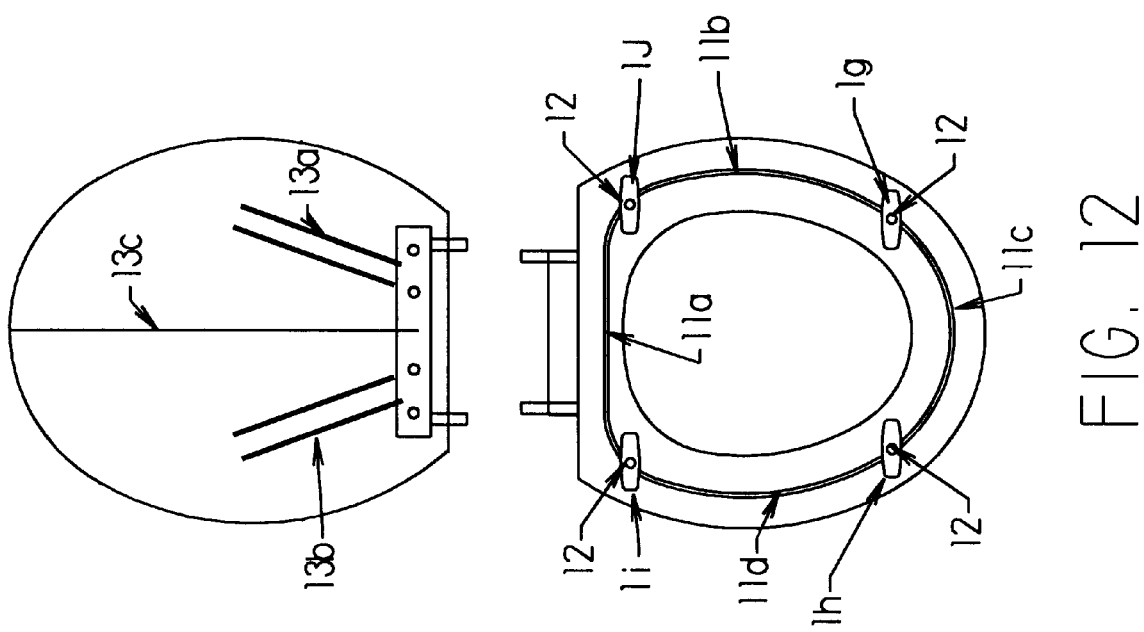
FIG. 12 is an exploded view illustrating the outside surface of the lid of the present invention and the bottom surface of the seat of the present invention.

Strategically placed ribs 11a, 11b, 11c and 11e, as shown in FIG. 12, can be used to minimize or eliminate this distortion. Since the thermoplastic material of the insert and the thermoplastic rubber are compatible, the materials will chemically bond under the heat and pressure of the injection molding operation.

Again it is desirable to prevent unsightly weld and joint lines in the over-mold material. In the exemplary embodiment of FIGS. 3 and 5, it is possible to introduce the over-mold material into the mold through a single gate approximately at 17. The ribs 11a, 11b, 11c, 11e and 13a, 13b and 13c of FIG. 12, and ribs 14a, 14b, 14c and 14d of FIG. 2 (which are unique to each seat and lid) are designed and located to minimize the disturbance of the flow of the thermoplastic elastomer. At the same time, the flow path of the elastomer in the mold must be carefully designed to provide the most efficient elastomer-to-insert bonding.

Insert 1b is also designed to provide a mechanical bond, wherever possible, between the thermoplastic rubber and the insert. In areas where delamination would be most likely to occur, such as at thin fleeting edges of the insert, the insert is configured to cause the thermoplastic rubber to hook thereabout, forming a permanent melt seal. Such permanent melt seals are indicated at 15 in FIG. 6.

Because of the two-step injection molding process of the present invention, specific rheological analysis was made to ensure compatibility between the two processes and to provide critical data such as linear and transverse shrinkage ratios, as well on the structural strength, shrinkage, and warpage of the seat assembly.

During the injection molding of the insert 1a, the reinforced synthetic material was introduced into the mold at a point generally indicated in FIG. 1 at 16. This, of course, created a sprue which had to be removed. During the over-molding process the insert 1a was supported in the second mold primarily by means on pins entering openings indicated at 12 in FIG. 3 and also the seat supported by the nibs 11a, 11b, 11c, and 11e. Again, a single gate was used, the gate being located at a point generally indicated at 17 in FIG. 3. Again a sprue was created and removed.

Figure 13:
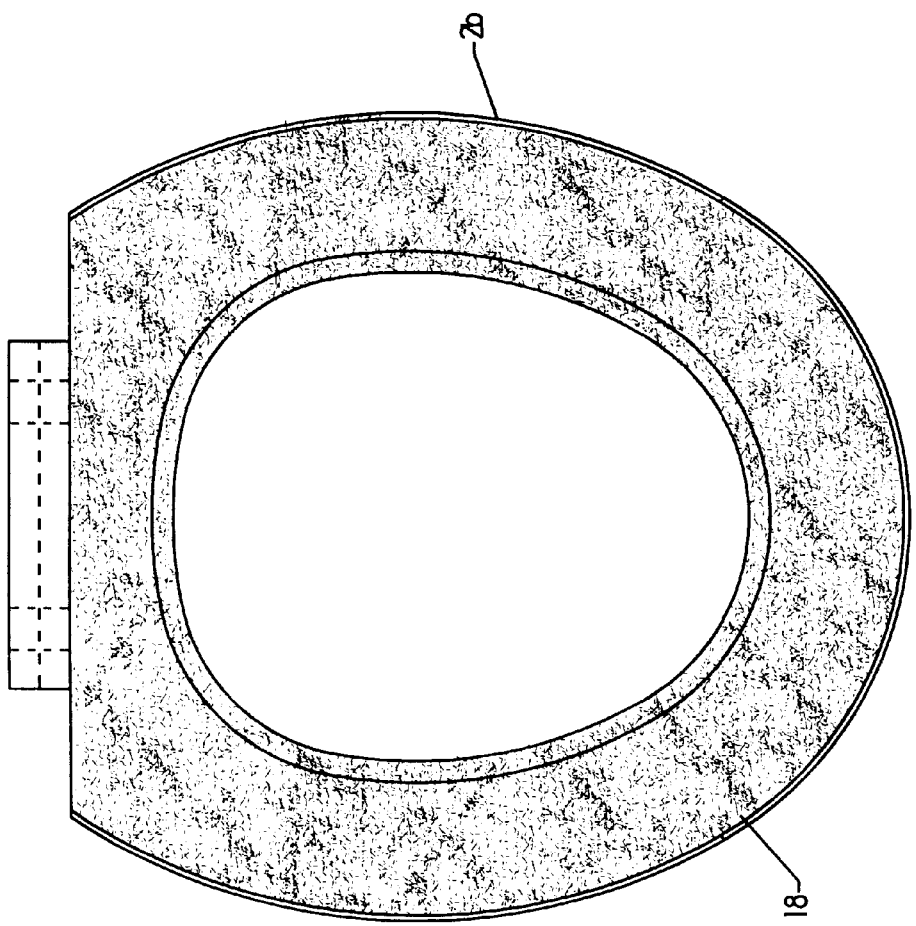
FIG. 13 is a top plan view of a seat of the present invention provided with areas or bands of texture.
Figure 14:
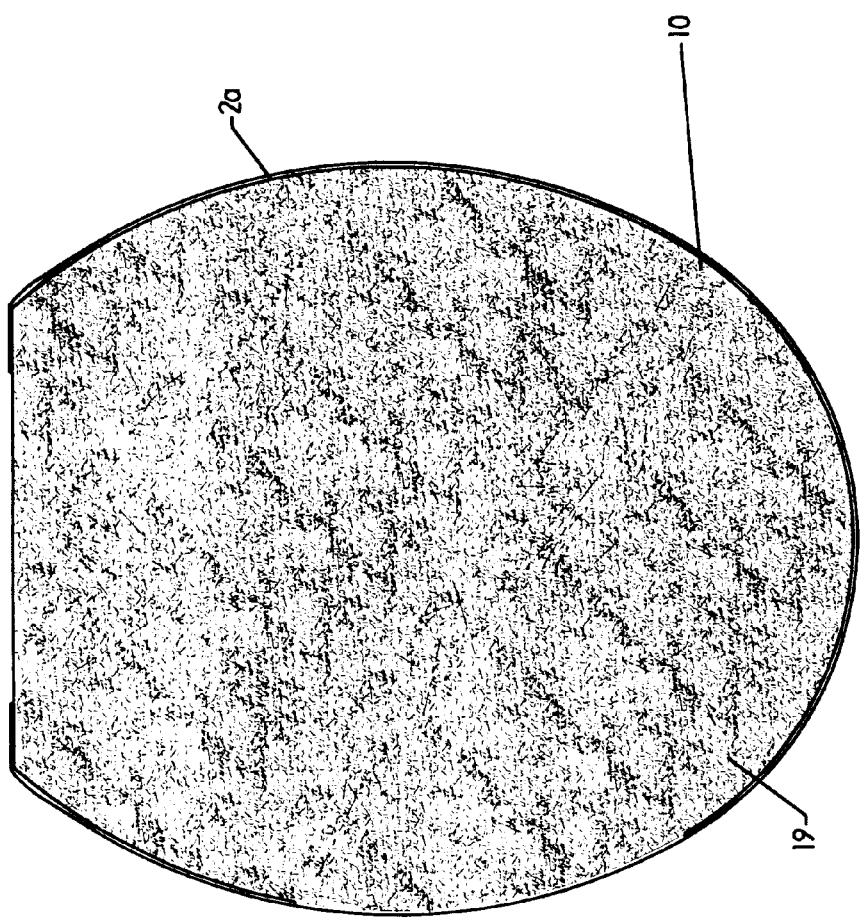
FIG. 14 is a top plan view of the lid of the present invention provided with areas or bands of texture.
Figure 15:
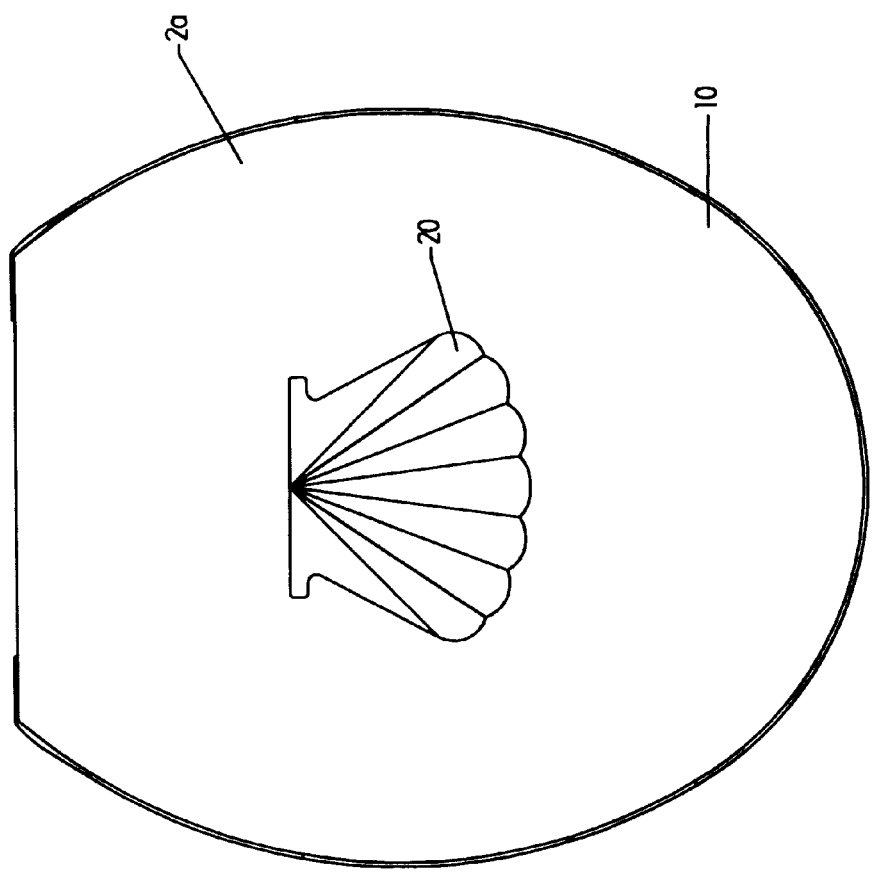
FIG. 15 is a top plan view of a lid having a sculpture formed by the over-molding.

It is within the scope of the invention to provide selected portions of the surface of the over-molded thermoplastic elastomer with a appearance-enhancing texture. The texture may be of any appropriate and well known type. In FIG. 13 and 14, the upper seating portions of the seat and the entire lid are shown provided with textured areas 18 and 19, respectively, wherein the surface is of a subtle type which enhances the appearance. At the same time, the textured surface 18 and 19 preferably allow the user adequate mobility while seated and also retained easy cleaning characteristics. It will be understood that textured areas may be applied to the entire seat and lid surface or selectively as desired or not at all. For decorative purposes some seats and lids may also be molded with sculpted surfaces. The sculpted surfaces may be of any appropriate design. In FIG. 15, the top surface of lid 2a is shown provided with one such sculpted area indicated at 20.

As stated above, some seats and lids may be made with the hinges molded as part of the insert and some may use separate decorative hinges made of metal or plastic for example. An exemplary metal hinge is illustrated in FIG. 16 at 20.

When a seat assembly of the present invention is to be provided with metal hinges such as cooperating hinge elements 20a and 20b (see FIG. 16), the hinge elements are provided with perforated flanges 21a and 21b molded into the inserts providing a secure mechanical bond between each hinge element and its respective seat or lid insert. The over-mold may also incorporate parts of the hinge. FIG. 16 illustrates a seat assembly 22a and 22b of the present invention provided with separate molded in hinge elements 20a and 20b. The hinge elements 20a and 20b may be made of metal, rigid plastic, or any other appropriate rigid material.

Figure 17:
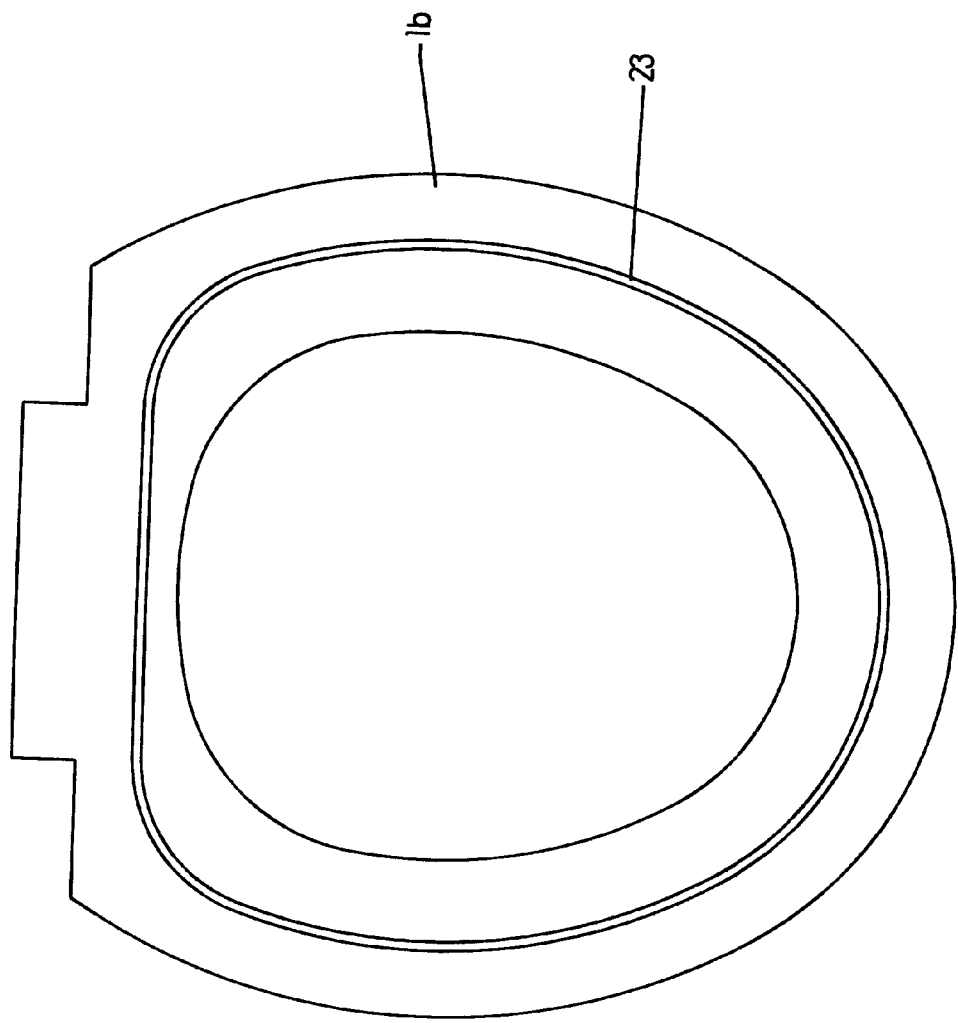
FIG. 17 is a bottom plan view of a seat of the present invention provided with a groove to receive a heating element.

To further enhance the flexibility in manufacturing specialized seats and take advantage of the unique molding process, FIGS. 17 and 18 show channels 23 that can be incorporated in the reinforced thermoplastic seat inset 1b to allow for the installation of a low wattage heating element or elements 24. The insert with the heating element would then be over-molded thereon with the thermoplastic elastomer totally encasing the heating element. Provisions are made on the over-mold to allow the electrical cord to exit the mold during the molding process. On the finished seat the cord would exit the rear of the seat so that it could be plugged it to a convenient electrical outlet.

Modifications may be made in the invention without departing from the spirit of it. For example, the teachings of the present invention are also applicable to toilet seats without lids.

What is claimed is:

1. A seat assembly for a toilet, said assembly comprising: a strong, substantially rigid, injection molded seat insert of a first synthetic material; said molded seat insert having a top surface, a bottom surface and surrounding side surfaces; at least part of said top surface having an injection over-molded layer of a second synthetic material to form a finished toilet seat; said over-mold material having a durometer hardness less than the hardness of said durometer hardness of said seat insert; said injection molded seat insert constitutes substantially the bulk of said finished seat; said first synthetic material and said second synthetic material being chemically compatible so that a chemical bond occurs between said injection molded seat insert and said over-mold layer.

2. A seat assembly for a toilet as recited in claim 1 wherein said first synthetic material and said second synthetic material are both of the same chemical base.

3. A seat assembly for a toilet as recited in claim 1 wherein said first synthetic material includes a reinforcing filler material.

4. A seat assembly for a toilet as recited in claim 3 wherein said reinforced synthetic material comprises fiberglass reinforced polypropylene containing from about 1% to about 2% of a foaming agent, said over-mold layer comprising an olefin base thermoplastic elastomeric material bondable with said injection molded seat insert, said over-mold second synthetic material containing an antimicrobial additive.

5. A seat assembly for a toilet as recited in claim 3 wherein said injection molded seat insert comprises an olefin base thermoplastic, said over-mold layer comprising an olefin base thermoplastic elastomer chemically bonded to said injection molded seat insert.

6. A seat assembly for a toilet as recited in claim 3 wherein said first synthetic material comprises fiberglass reinforced polypropylene, said over-mold layer comprising an olefin base thermoplastic elastomer chemically bonded to said injection molded seat insert.

7. A seat assembly for a toilet as recited in claim 3 wherein said first synthetic material further comprises a fiberglass reinforced, olefin base, thermoplastic material.

8. A seat assembly for a toilet as recited in claim 3 wherein said first synthetic material further comprises a fiberglass reinforced polypropylene.

9. A seat assembly for a toilet as recited in claim 1 wherein said over-mold layer comprises a thermoplastic elastomeric material with a durometer hardness of Shore D 50 or softer.

10. A seat assembly for a toilet as recited in claim 1 wherein said over-mold layer comprises a thermoplastic elastomer bondable with said injection molded seat insert.

11. A seat assembly for a toilet as recited in claim 1 wherein said over-mold layer comprises an olefin base thermoplastic elastomeric material.

12. A seat assembly for a toilet as recited in claim 1 wherein said over-mold layer includes an antimicrobial additive.

13. A seat assembly for a toilet as recited in claim 1 wherein an appearance enhancing texture is provided in at least selected areas of said seat.

14. A seat assembly for a toilet as recited in claim 1 including hinge elements for said seat, said hinge elements comprising an integral one-piece part of said injection molded seat insert.

15. A seat assembly for a toilet as recited in claim 1 including hinge elements for said seat, said hinge elements being embedded in said injection molded seat insert.

16. A seat assembly for a toilet as recited in claim 1 including at least one heating element located in a groove in said injection molded seat insert and covered by said over-mold layer.

17. A seat assembly for a toilet as recited in claim 1 further comprising a lid assembly, said lid assembly comprising: a strong, substantially rigid, injection molded lid insert of a first synthetic material; said molded lid insert having a top surface, a bottom surface and surrounding side surfaces; at least part of said top surface having an injection over-molded layer of a second synthetic material to form a finished toilet seat lid; said over-mold material having a durometer hardness less than the durometer hardness of said lid insert; said injection molded lid insert constitutes substantially the bulk of said finished lid; said first synthetic material and said second synthetic material being chemically compatible so that a chemical bond occurs between said injection molded lid insert and said over-mold layer.

18. A method of making a seat assembly for a toilet comprising the steps of:
  (A) injection molding a strong substantially rigid, lightweight seat insert of a first synthetic material, said molded seat insert having a top surface, a bottom surface and surrounding side surfaces;
  (B) injection over-molding at least part of said top surface with an over-mold layer of a second synthetic material having a durometer hardness less than the durometer hardness of said seat insert to form a finished toilet seat; said injection molded seat insert constitutes substantially the bulk of said finished seat; said first synthetic material and said second synthetic material being chemically compatible so that a chemical bond occurs between said injection molded seat insert and said over-mold layer.

19. A method as claimed in claim 18 wherein said over-mold layer comprises a thermoplastic elastomeric material with a durometer hardness of Shore D 50 or softer.

20. The method as claimed in claim 18 wherein said over-mold layer of said second synthetic material comprises a thermoplastic elastomer bondable with said seat insert.

21. The method as claimed in claim 18 wherein first synthetic material comprises a fiberglass reinforced olefin base thermoplastic material and said over-mold layer of said second synthetic material comprises an olefin base thermoplastic elastomer.

22. The method as claimed in claim 18 wherein first synthetic material comprises fiberglass reinforced polypropylene and said over-mold layer of said second synthetic material comprises an olefin base elastomer, and including the step of injection over-molding said insets with said over-mold material at such temperature and pressure as to chemically bond said over-mold material to said insert.

* * * * *